(12) United States Patent
Ito (10) Patent No.: US 10,027,880 B2
(45) Date of Patent: Jul. 17, 2018

(54) IMAGE PICKUP APPARATUS, AUTOFOCUS METHOD, AND STORAGE MEDIUM

(71) Applicant: Olympus Corporation, Hachioji-shi, Tokyo (JP)

(72) Inventor: Satoru Ito, Komae (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/602,683

(22) Filed: May 23, 2017

(65) Prior Publication Data

US 2017/0347017 A1  Nov. 30, 2017

(30) Foreign Application Priority Data

May 25, 2016  (JP) ................. 2016-104451

(51) Int. Cl.
*H04N 5/232* (2006.01)
*G02B 7/36* (2006.01)
*G02B 7/28* (2006.01)
*G02B 7/09* (2006.01)

(52) U.S. Cl.
CPC ........... *H04N 5/23212* (2013.01); *G02B 7/09* (2013.01); *G02B 7/285* (2013.01); *G02B 7/36* (2013.01)

(58) Field of Classification Search
CPC ................................ H04N 5/23212

USPC ......................................... 348/353
See application file for complete search history.

(56) References Cited

U.S. PATENT DOCUMENTS

2016/0277668 A1* 9/2016 Yokozeki ............. G02B 7/34

FOREIGN PATENT DOCUMENTS

JP        2012-189878       10/2012

\* cited by examiner

*Primary Examiner* — Joel Fosselman
(74) *Attorney, Agent, or Firm* — John C. Pokotylo; Pokotylo Patent Services (57) ABSTRACT

An image pickup apparatus includes a first focus detection circuit configured to calculate an evaluation value indicative of a contrast based on an image pickup signal output by an image pickup device, a second focus detection circuit configured to perform focus detection based on phase difference detection to output a defocus amount of an image-acquiring optical system including a focus lens, and a control circuit configured to control a focusing operation of detecting a position of the focus lens where the evaluation value is indicative of an extreme value based on an output from the first focus detection circuit. Based on the defocus amount output by the second focus detection circuit, the control circuit controls initial position driving of the focus lens executed before the focusing operation is performed.

11 Claims, 8 Drawing Sheets

IMAGE PICKUP APPARATUS, AUTOFOCUS METHOD, AND STORAGE MEDIUM

CROSS-REFERENCE TO RELATED APPLICATION

This application is based upon and claims the benefit of priority from prior Japanese Patent Application No. 2016-104451, filed on May 25, 2016, the entire contents of which are incorporated herein by reference.

BACKGROUND OF THE INVENTION

1. Field of the Invention

The present invention relates to an image pickup apparatus, an autofocus method for such an image pickup apparatus, and a storage medium in which a computer-readable autofocus program is stored in a non-transitory manner.

2. Description of the Related Art

An image pickup apparatus is equipped with an automatic focusing (what is called autofocus (AF)) function to automatically focus on an object. The AF function involves various systems. For example, a phase difference AF system is known in which focusing based on a pupil division phase difference system is performed based on output signals from pixel rows for focus detection provided in an image pickup device. A contrast AF system is also widely used in which focusing based on a contrast detection system is performed based on output signals from pixels for image pickup provided in an image pickup device. An image pickup apparatus referred to as a hybrid AF system is also known which adopts a plurality of AF systems, for example, both a phase difference AF system and a contrast AF system.

Jpn. Pat. Appln. KOKAI Publication No. 2012-189878 proposes a technique described below for an image pickup apparatus that adopts such a hybrid AF system. In the technique, the direction of the first scan in the contrast AF system is determined using a defocus amount detected based on image surface phase difference information. The use of the technique enables prevention of "scan reversal resulting from mismatch between the first scan direction and a peak direction", achieving improvement of AF speed and operation quality.

BRIEF SUMMARY OF THE INVENTION

According to a first aspect of embodiments, there is provided an image pickup apparatus including an image pickup device configured to pick up an image of object light via an image-acquiring optical system including a focus lens to generate an image pickup signal, a first focus detection circuit configured to calculate an evaluation value indicative of a contrast based on the image pickup signal output by the image pickup device, a second focus detection circuit configured to perform focus detection based on phase difference detection to output a defocus amount of the image-acquiring optical system, and a control circuit configured to control a focusing operation of detecting a position of the focus lens where the evaluation value is indicative of an extreme value based on an output from the first focus detection circuit, wherein based on the defocus amount output by the second focus detection circuit, the control circuit controls initial position driving of the focus lens executed before the focusing operation based on the output from the first focus detection circuit is performed.

According to a second aspect of embodiments, there is provided an autofocus method of performing a focusing operation based on an evaluation value, the method including calculating the evaluation value indicative of a contrast based on an image pickup signal output by an image pickup device configured to pick up an image of object light via an image-acquiring optical system including a focus lens to generate the image pickup signal, to detect a position of the focus lens where the evaluation value is indicative of an extreme value, the method including performing focus detection based on phase difference detection to calculate a defocus amount of the image-acquiring optical system, and based on the calculated defocus amount, controlling initial position driving of the focus lens which is executed before the focusing operation based on the evaluation value is performed.

According to a third aspect of embodiments, there is provided a storage medium non-transitory storing computer-readable autofocus programs which are readable by a computer, the computer performing an image pickup function which picks up an image of object light via an image-acquiring optical system including a focus lens to generate an image pickup signal, a first focus detection function which calculates an evaluation value indicative of a contrast based on the image pickup signal output by the image pickup function, a second focus detection function which performs focus detection based on phase difference detection to output a defocus amount of the image-acquiring optical system, and a control function which controls a focusing operation of detecting a position of the focus lens where the evaluation value is indicative of an extreme value based on an output from the first focus detection function, wherein based on the defocus amount output by the second focus detection function, the control function controls initial position driving of the focus lens executed before the focusing operation based on the output from the first focus detection function is performed.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
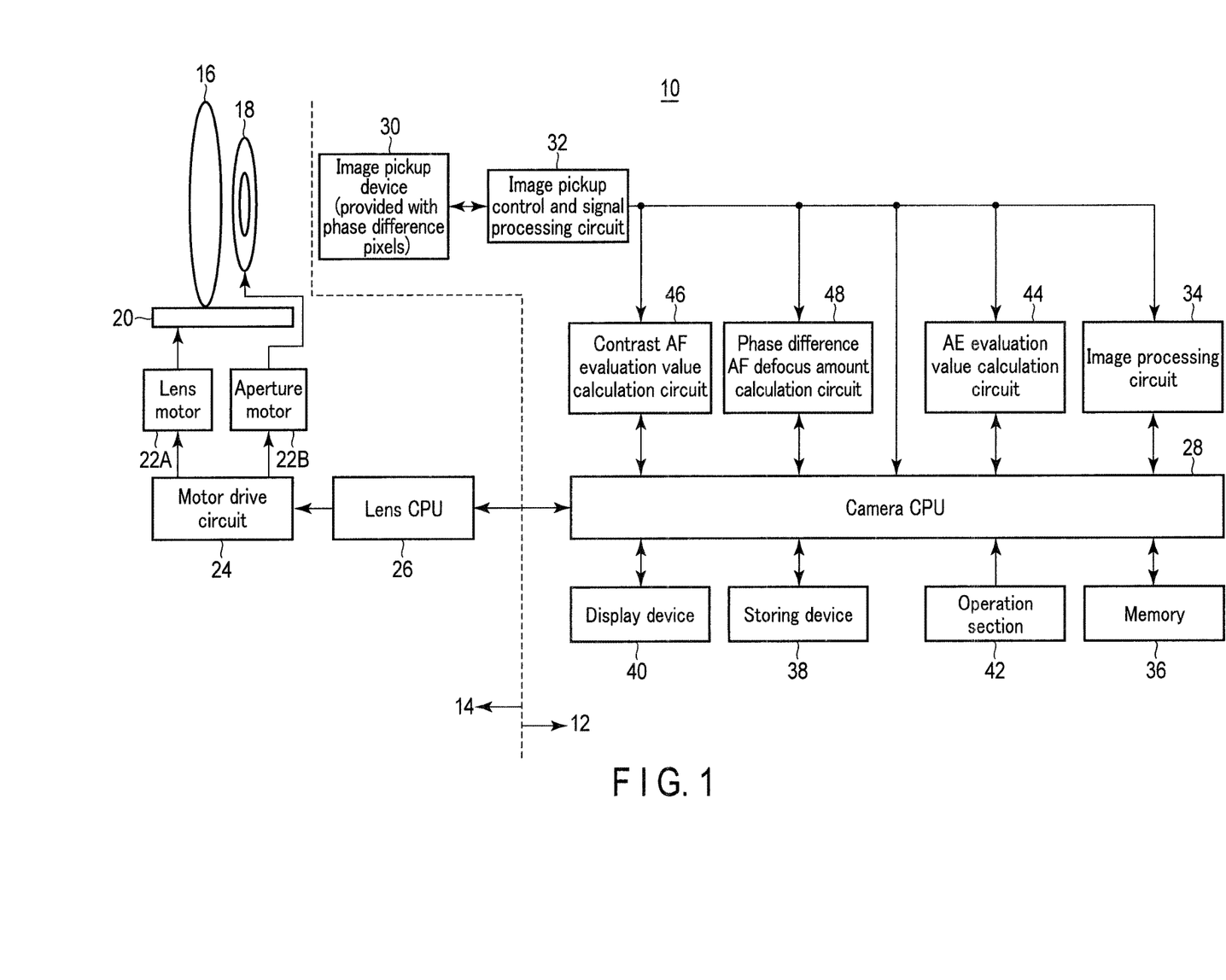
FIG. 1 is a block diagram of a configuration of an image pickup apparatus according to an embodiment of the present invention.

As illustrated in FIG. 1, an image pickup apparatus 10 according to an embodiment of the present invention includes a body unit 12 and a replaceable lens unit (that is, a lens barrel) 14 serving as an accessory device.

The lens unit 14 can be removably installed in the body unit 12 via a lens mount provided on a front surface of the body unit 12 and not depicted in the drawings. The lens unit 14 includes an image-acquiring optical system 16 including a focus lens, an aperture 18, a lens frame 20, a lens motor 22A, an aperture motor 22B, a motor drive circuit 24, and a lens CPU 26.

The image-acquiring optical system 16 is supported by the lens frame 20. The lens motor 22A moves the lens frame 20 in order to move the image-acquiring optical system 16 along the direction of an optical axis direction. The aperture motor 22B opens and closes the aperture 18 in order to adjust the opening of the aperture 18. The lens motor 22A and the aperture motor 22B are driven via the motor drive circuit 24 in accordance with control signals from the lens CPU 26.

The lens CPU 26 controllably drives sections in the lens unit 14 such as the lens motor 22A and the aperture motor 22B. The lens CPU 26 is electrically connected to the camera CPU 28 provided in the body unit 12, via a communication connector not depicted in the drawings, and is controlled in accordance with instructions from the camera CPU 28. That is, the camera CPU 28 and the lens CPU 26 are electrically connected together via the communication connector so as to be able to communicate with each other when the lens unit 14 is installed in the body unit 12. The lens CPU 26 operates while cooperating dependently with the camera CPU 28.

On the other hand, the body unit 12 includes, on an optical axis of the image-acquiring optical system 16 in the lens unit 14, an image pickup device 30 configured to photoelectrically convert an object image having passed through the image-acquiring optical system 16. That is, a luminous flux having passed through the image-acquiring optical system 16 and the aperture 18 is formed into an image on an image pickup surface of the image pickup device 30. The image pickup device 30 is configured to be able to control exposure using an electronic shutter (for example, an electronic rolling shutter). Examples of the image pickup device 30 include a CMOS sensor and a CCD sensor. The electric rolling shutter refers to a shutter that performs resetting or signal reading on a plurality of pixels two-dimensionally arranged on the image pickup surface of the image pickup device 30 such that the resetting or signal reading is executed on each of the pixels in time series order or in units of lines. That is, the image pickup device 30 can accomplish functions similar to the functions of a mechanical shutter by electronically controlling signal accumulation time for each pixel or each line. Although not depicted in the drawings, the image pickup device 30 has phase difference pixels that allow focusing based on a pupil division phase difference system.

The body unit 12 is provided with an image pickup control and signal processing circuit 32 connected to the image pickup device 30. The image pickup control and signal processing circuit 32 is connected to the camera CPU 28 to control the electronic shutter of the image pickup device 30 in accordance with instructions from the camera CPU 28.

The camera CPU 28 further connects to an image processing circuit 34, a memory 36, a storing device 38, a display device 40, an operation section 42, an AE evaluation value calculation circuit 44, a contrast AF evaluation value calculation circuit 46, and a phase difference AF defocus amount calculation circuit 48. The image pickup control and signal processing circuit 32 is connected to the image processing circuit 34 configured for image processing. The body unit 12 is configured to be able to provide an electronic image pickup function using the camera CPU 28, the image pickup device 30, the image pickup control and signal processing circuit 32, the image processing circuit 34, the memory 36, and the storing device 38.

The image processing circuit 34 loads image pickup signals output by the image pickup device 30, via the image pickup control and signal processing circuit 32 in accordance with instructions from the camera CPU 28. Each of the image pickup signals is converted into a video signal by the image processing circuit 34, and the video signal is output to the display device 40 via the camera CPU 28 so that the display device 40 can provide display. A photographer can check an acquired image via a displayed image on the display device 40.

The memory 36 provided as a storage area includes, for example, an SDRAM and a flash ROM. In this case, the SDRAM is a memory for temporary storage of image pickup signals and is used as a work area or the like when an image pickup signal is converted. The image processing circuit 34 is subjected to various types of image processing and thus converted into a JPEG data, which is stored in the storing device 38. The storing device 38 is an external storage medium such as any of various memory cards or an external hard disc drive (HDD). The storing device 38 is installed in the body unit 12 of the image pickup apparatus 10 so as to be able to communicate with the body unit 12 and to be replaceable. The flash ROM stores in a nonvolatile manner a control program executed by the camera CPU 28 and data such as control parameters and mode setting values which are referenced or changed during execution of the control program.

Although not depicted in the drawings, the operation section 42 includes a switch group including operation buttons needed to operate the image pickup apparatus 10, for example, a release switch that gives an instruction to perform an image acquisition operation, a mode change switch that switches between an image acquisition mode and an image display mode, and a power switch. The release switch involves a half press operation for a release button, that is, a first release depressing operation, and a second release depressing operation that is a full press operation for the release button.

The AE evaluation value calculation circuit 44 calculates an AE (Automatic Exposure) evaluation value from the image pickup signal output by the image pickup device 30. The camera CPU 28 sets an exposure state (a shutter speed and an f-number) based on the AE evaluation value calculated by the AE evaluation value calculation circuit 44. Information indicative of the f-number is sent from the camera CPU 28 to the lens CPU 26, which controls the opening of the aperture 18 in accordance with the information.

The contrast AF evaluation value calculation circuit 46 loads the image pickup signal output by the image pickup device 30 via the image pickup control and signal processing circuit 32, and calculates the AF evaluation value, which is indicative of contrast, based on the image pickup signal. The camera CPU 28 determines a lens position where the camera is focused using the focus lens provided in the image-acquiring optical system 16, based on the AF evaluation value calculated by the contrast AF evaluation value calculation circuit 46.

The phase difference AF defocus amount calculation circuit 48 loads, via the image pickup control and signal processing circuit 32, signals from phase difference pixels provided in the image pickup device 30, and performs focus detection based on phase difference detection to output a defocus amount of the image-acquiring optical system 16. Based on the defocus amount output by the phase difference AF defocus amount calculation circuit 48, the camera CPU 28 controls initial position driving of the focus lens executed before a focusing operation based on an output from the contrast AF evaluation value calculation circuit 46 is performed. Instead of the phase difference pixels provided in the image pickup device 30, a dedicated sensor may be provided so that the phase difference can be calculated using a signal from the sensor.

Figure 2A:
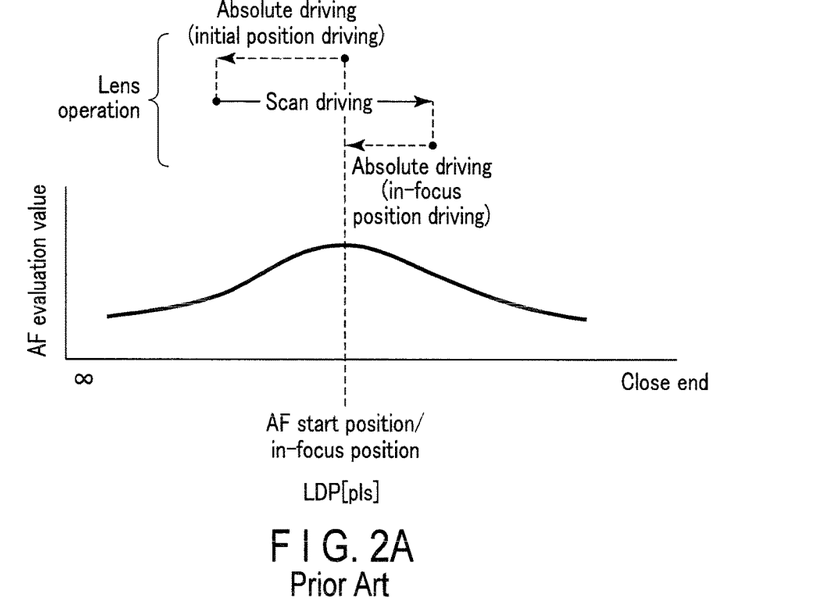
FIG. 2A is a diagram illustrating a lens operation performed when initial position driving is executed if a position where a lens is placed when an instruction to start AF is given is an in-focus position.
Figure 2B:
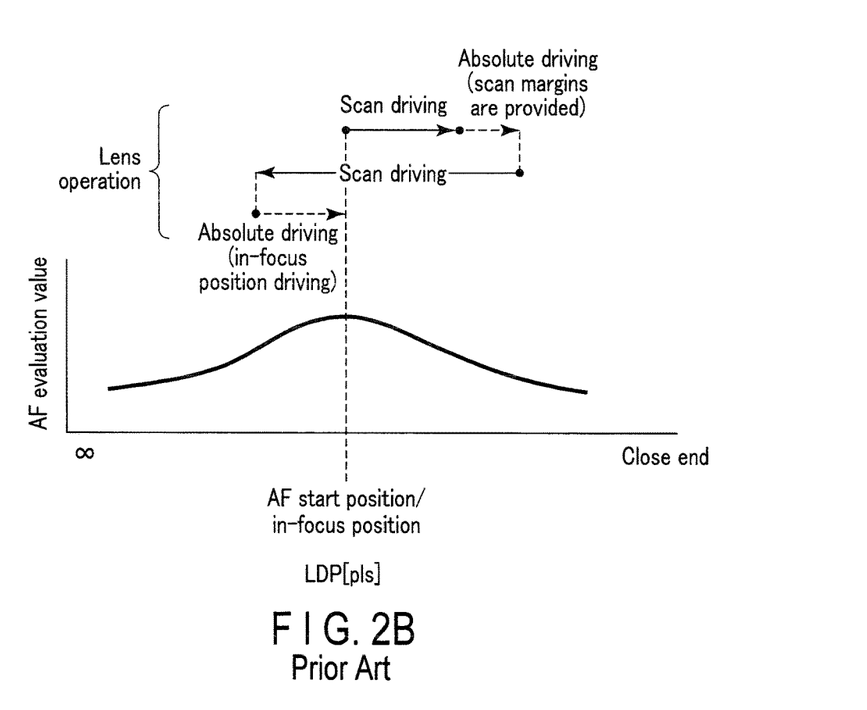
FIG. 2B is a diagram illustrating a lens operation performed when the initial position driving is not executed if the position where the lens is placed when the instruction to start AF is given is the in-focus position.

The "initial position driving" refers to lens driving executed in order to reduce an AF time when the first release depression is performed to give an instruction to start AF with the lens position coinciding with an in-focus position. That is, the initial position driving is intended to "displace" a scan start position of the focus lens from a position where the lens is placed when the instruction to start AF is given (hereinafter referred to as an AF start position) as illustrated in FIG. 2A. This "displacement" is the amount of driving that enables an in-focus state to be detected in the shortest time. If an AF operation is started at the AF start position=in-focus position, only one scan driving operation is needed before peak detection is achieved. If the AF operation is started at the AF start position=in-focus position, when execution of the initial position driving is omitted, two scan driving operations are needed before peak detection is achieved as illustrated in FIG. 2B. Consequently, much time is needed to complete AF.

In the image pickup apparatus 10 configured as described above, a luminous flux incident through the image-acquiring optical system 16 is guided to the image pickup device 30 via the aperture 18. The image pickup device 30 generates image pickup signals. The image processing circuit 34 controls the image pickup control and signal processing circuit 32 in accordance with instructions from the camera CPU 28, and loads the image pickup signal from the image pickup device 30. The image pickup signal acquired is loaded via the camera CPU 28 into the memory 36, which is a memory for temporary storage. The image pickup signal loaded in the memory 36 is read by the image processing circuit 34 via the camera CPU 28. The image processing circuit 34 converts the read image pickup signal into a video signal and outputs the video signal to the display device 40 via the camera CPU 28 so that the display device 40 can provide display. Consequently, the photographer can check the acquired image in the displayed image on the display device 40, that is, what is called a live view image.

Figure 3A:
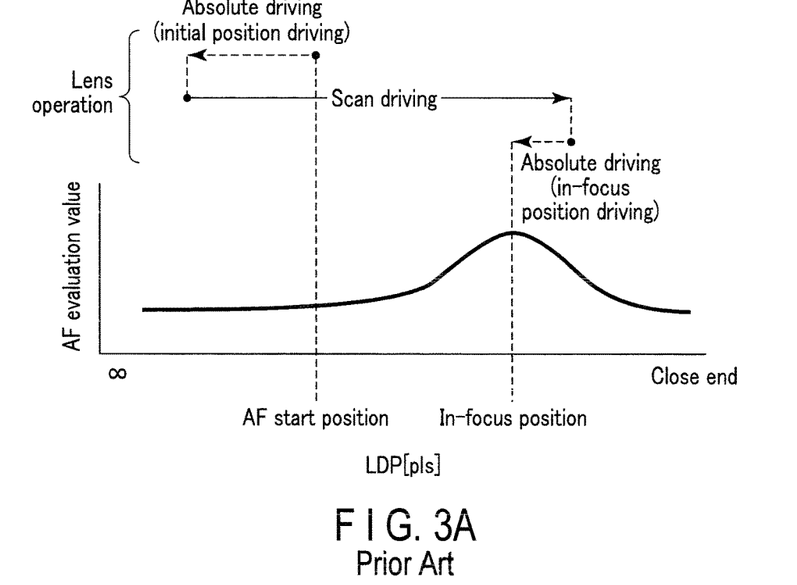
FIG. 3A is a diagram illustrating a lens operation performed when the initial position driving is executed if the position where the lens is placed when the instruction to start AF is given is a significantly out-of-focus position.
Figure 3B:
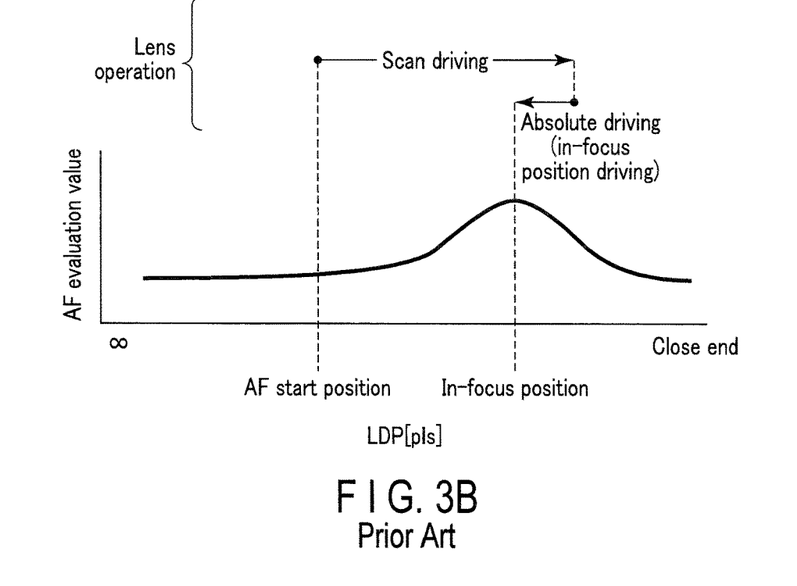
FIG. 3B is a diagram illustrating a lens operation performed when the initial position driving is not executed if the position where the lens is placed when the instruction to start AF is given is the significantly out-of-focus position.

The focusing with the focus lens provided in the image-acquiring optical system 16 is performed as follows. That is, scan driving is executed to sequentially vary the position of the focus lens, and images are sequentially acquired. The contrast AF evaluation value calculation circuit 46 sequentially generates AF evaluation values. In the image pickup apparatus 10 according to the present embodiment, before the scan driving is executed, the camera CPU 28 determines whether the initial position driving of the focus lens is needed based on the defocus amount output by the phase difference AF defocus amount calculation circuit 48. As described above, if the AF operation is started at the AF start position=in-focus position, only one scan driving operation is needed before peak detection is achieved. However, if the AF start position is not the in-focus position, the initial position driving is a meaningless operation and in fact contributes to reducing the AF speed as illustrated in FIG. 3A. If the AF start position is a significantly out-of-focus position, omission of the initial position driving reduces the time needed to complete AF as illustrated in FIG. 3B. Thus, before the scan driving is executed, the camera CPU 28 determines whether the initial position driving of the focus lens is needed. Upon determining that the initial position driving is needed, the camera CPU 28 allows execution of a needed amount of initial position driving of the focus lens. The camera CPU 28 calculates the lens position where the picked-up image has the highest contrast based on the AF evaluation value generated by the contrast AF evaluation value calculation circuit 46. The calculated lens position is transmitted from the camera CPU 28 to the lens CPU 26 in the body unit 12, and the lens CPU 26 controllably shifts the focus lens in the image-acquiring optical system 16 to the lens position.

The AE evaluation value calculation circuit 44 has a function to detect the intensity of light in the image pickup signal output by the image pickup device 30 to execute a well-known photometry process based on the intensity of light.

During image acquisition, upon receiving, from the camera CPU 28, a signal allowing the shutter to be controllably driven, the image pickup control and signal processing circuit 32 controls the electronic shutter based on the signal.

The image processing circuit 34 loads the image pickup signal from the image pickup device 30 into the memory 36 in accordance with the instruction from the camera CPU 28 as described above. Subsequently, the image processing circuit 34 executes various types of image processing on the image pickup signal loaded in the memory 36, converts the resultant signal into JPEG data, and stores the JPEG data in the storing device 38. When the image pickup signal is a moving image, the image processing circuit 34 converts the signal into MPEG data or the like and then stores the resultant data in the storing device 38.

When the photographer operates the mode change switch in the operation section 42 to switch from the image acquisition mode to the image display mode, the image pickup signal stored in the storing device 38 is read and can be displayed on the display device 40. That is, the image pickup signal read from the storing device 38 is converted into a video signal by the image processing circuit 34, and the video signal is output to the display device 40 via the camera CPU 28 so that the display device 40 can provide display.

Figure 4:
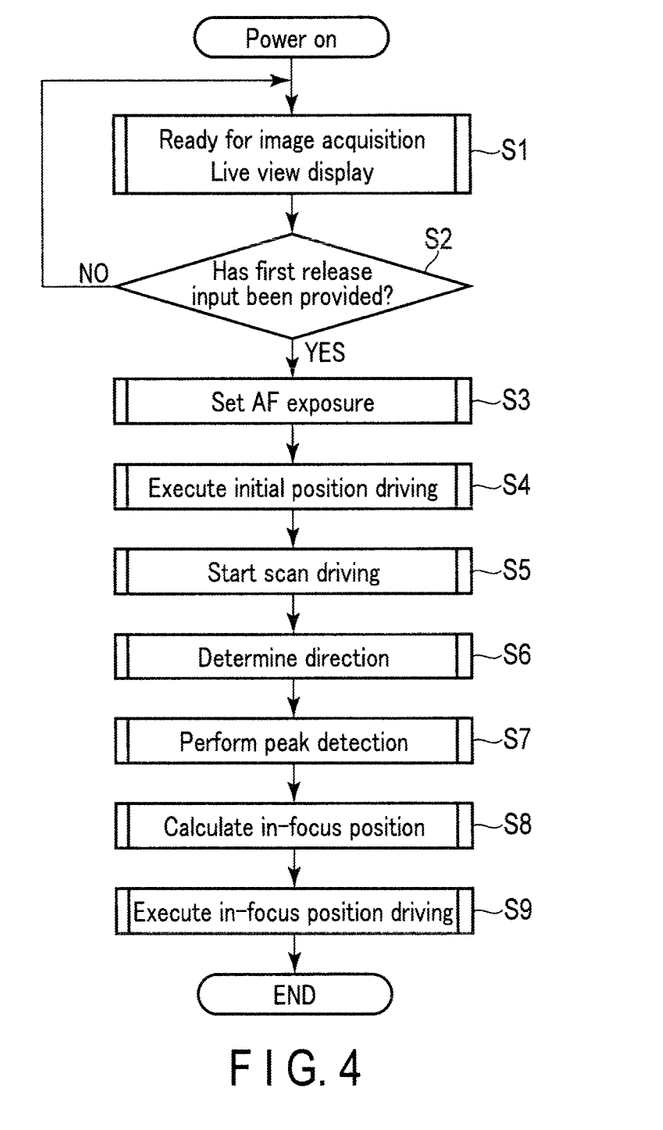
FIG. 4 is a flowchart illustrating an AF operation in the image pickup apparatus according to the embodiment.

Now, the AF operation in the image pickup apparatus 10 configured as described above will be described in detail with reference to a flowchart illustrated in FIG. 4.

First, when the photographer operates the power switch in the operation section 42 to turn on a body power supply, the camera CPU 28 performs a predetermined initialization operation, gets ready for image acquisition, and allows the display device 40 to provide live view display (step S1).

Subsequently, the camera CPU 28 determines whether or not the photographer has half pressed the release switch in the operation section 42, that is, whether or not the photographer has provided a first release input based on the first release depression (step S2). Upon determining that the first release input has not been provided, the camera CPU 28 returns the process to step S1 described above. Whether or not the first release input has been provided is periodically determined (for example, at every certain frame rate for image pickup). The camera CPU 28 also periodically communicates with the lens CPU 26 to acquire various types of information such as position information on the focus lens.

In contrast, upon determining that the first release input has been provided, the camera CPU 28 sets exposure for AF (step S3). That is, the camera CPU 28 allows the AE evaluation value calculation circuit 44 to execute the well-known photometry process to set an exposure state for AF (the shutter speed and the f-number).

Subsequently, the camera CPU 28 executes an initial position driving subroutine (step S4). In the initial position driving subroutine, the initial position driving of the focus lens is executed as needed based on the defocus amount output by the phase difference AF defocus amount calculation circuit 48. The initial position driving subroutine will be described below in detail.

Then, the camera CPU 28 starts scan driving of the focus lens (step S5). That is, the camera CPU 28 allows the contrast AF evaluation value calculation circuit 46 to start acquiring the AF evaluation value, and drives the motor drive circuit 24 and the lens motor 22A to start shifting the focus lens in the image-acquiring optical system 16. Lens driving control of the focus lens is performed based on a control command sent from the camera CPU 28 to the lens CPU 26.

Then, the camera CPU 28 makes a direction determination by determining whether or not the AF evaluation value found by the contrast AF evaluation value calculation circuit 46 has increased (step S6). Upon determining that the AF evaluation value has increased, the camera CPU 28 continues the scan driving. In contrast, upon determining that the AF evaluation value has decreased, the camera CPU 28 reverses the moving direction of the focus lens and allows the scan driving to be executed.

Then, the camera CPU 28 performs peak detection (step S7). Upon detecting the peak of the AF evaluation value, the camera CPU 28 calculates the in-focus position (step S8). Subsequently, the camera CPU 28 executes in-focus position driving to shift the focus lens to the calculated in-focus position (step S9).

Subsequently, although not depicted in the drawings, the camera CPU 28, in accordance with a second release input that is the full press operation of the release switch, performs an exposure operation, executes various types of image processing on the image pickup signal from the image pickup device 30, and stores the resultant signal in the storing device 38.

Figure 5:
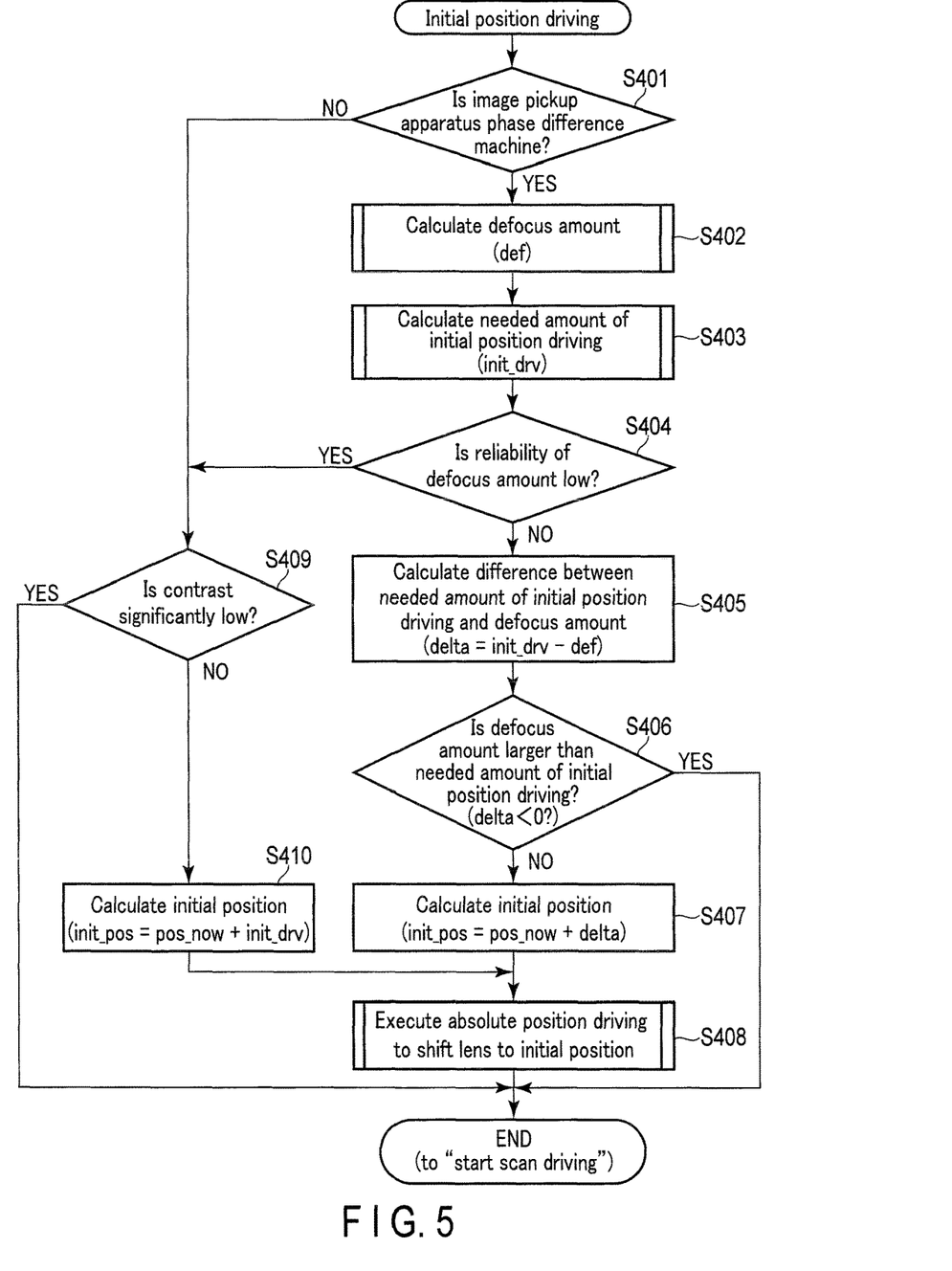
FIG. 5 is a flowchart illustrating an operation of an initial position driving subroutine in FIG. 4.

Now, the initial position driving subroutine executed in step S4 described above will be described in detail with reference to a flowchart in FIG. 5.

In the initial position driving subroutine, the camera CPU 28 first determines whether or not the image pickup apparatus 10 is a phase difference machine that enables phase difference AF (step S401).

Upon determining that the image pickup apparatus 10 is a phase difference machine, the camera CPU 28 allows the phase difference AF defocus amount calculation circuit 48 to calculate the defocus amount "def" (step S402). Subsequently, the camera CPU 28 calculates the needed amount of initial position driving "init_drv" (step S403). For example, when the amount of scan driving per frame is denoted by "frame_drv", the needed number of frames is denoted by "n", and an adjustment coefficient is denoted by "k", the needed amount of initial position driving "init_drv" is determined by:

$$\text{init\_drv} = \text{frame\_drv} * n + k.$$

Figure 6A:
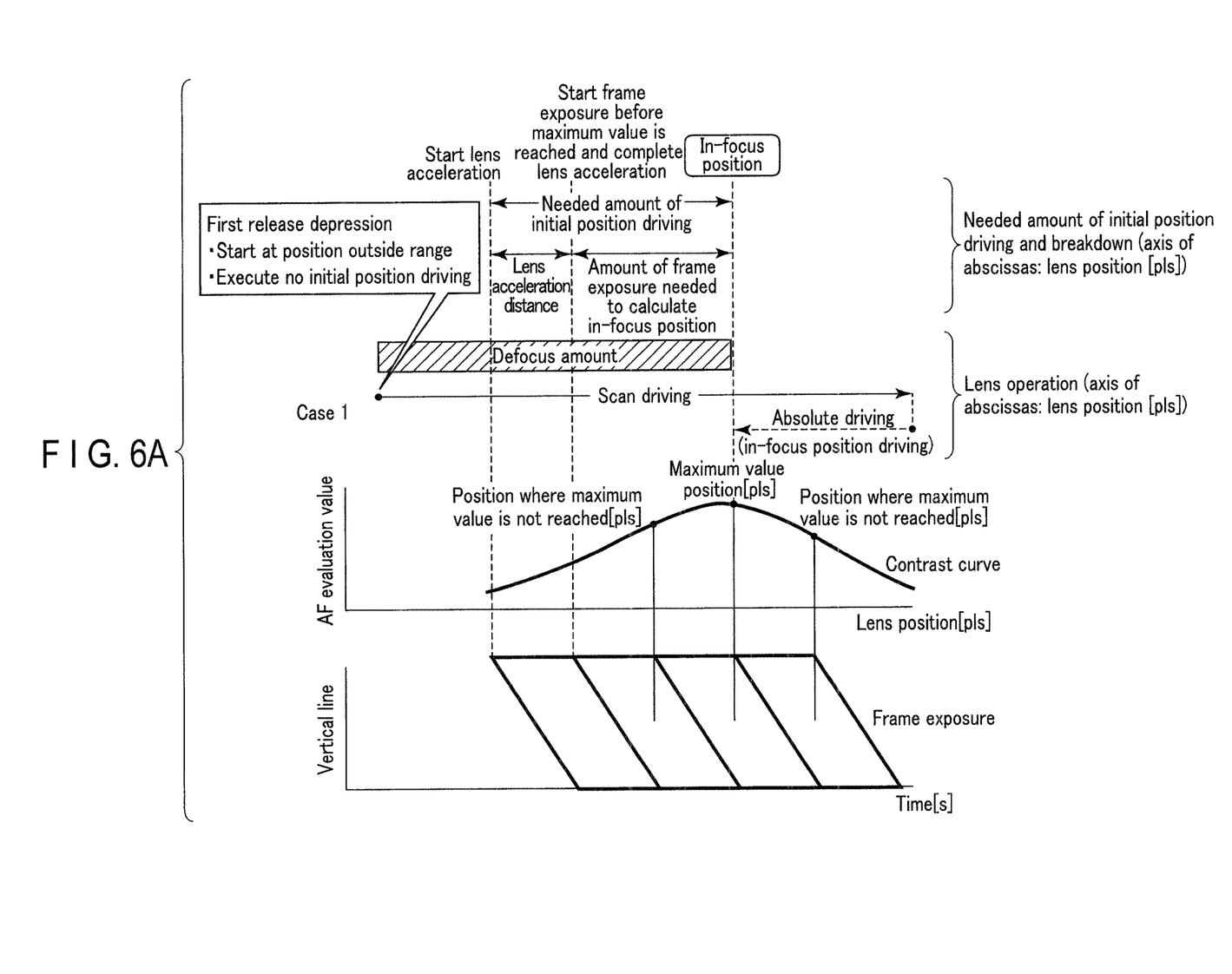
FIG. 6A is a diagram illustrating lens driving executed if the position where the lens is placed when the instruction to start AF is given in the image pickup apparatus according to the embodiment is the significantly out-of-focus position (case 1)
Figure 6B:
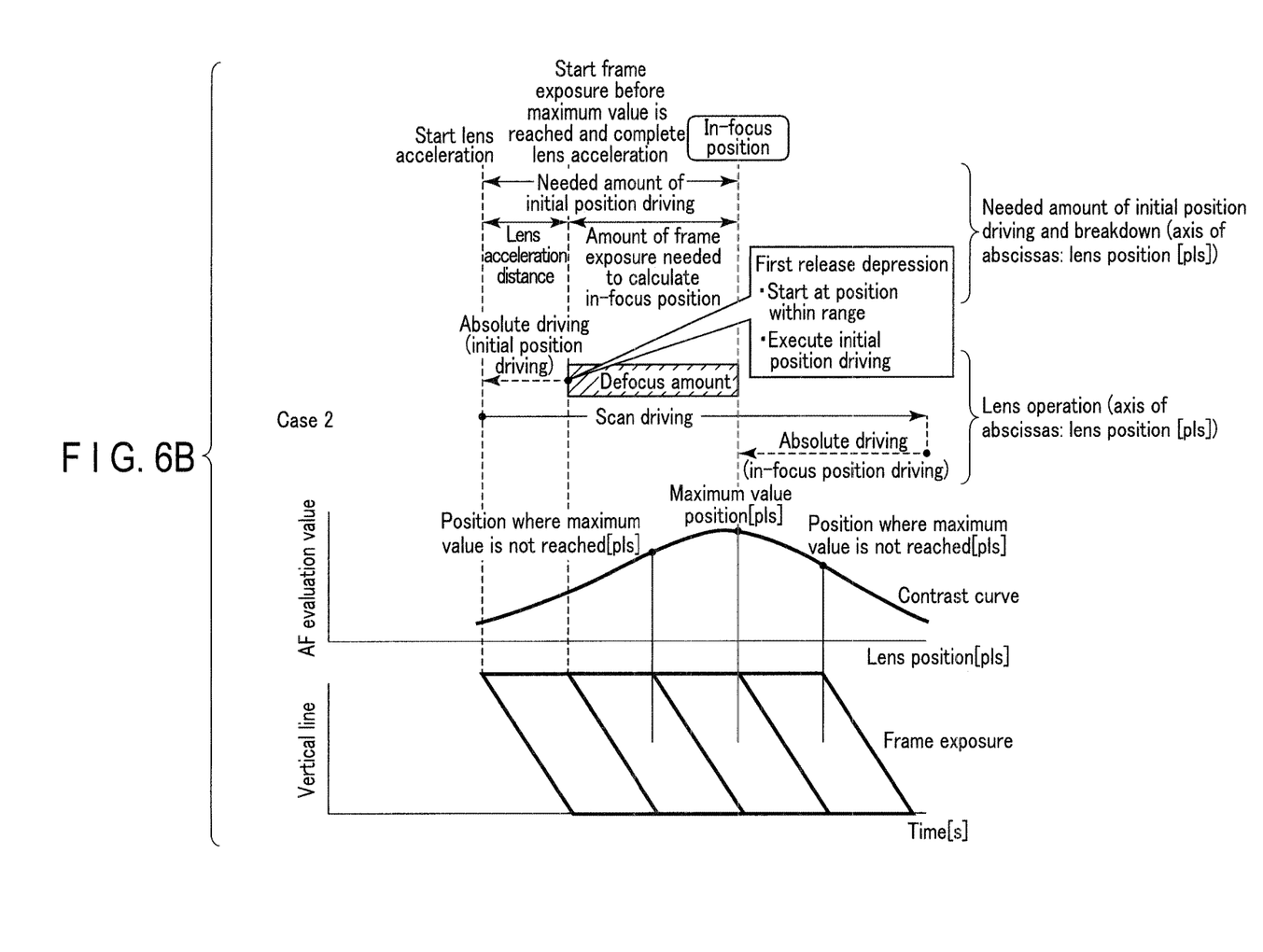
FIG. 6B is a diagram illustrating lens driving executed if the position where the lens is placed when the instruction to start AF is given lies within the range of a needed amount of initial position driving (case 2)
Figure 6C:
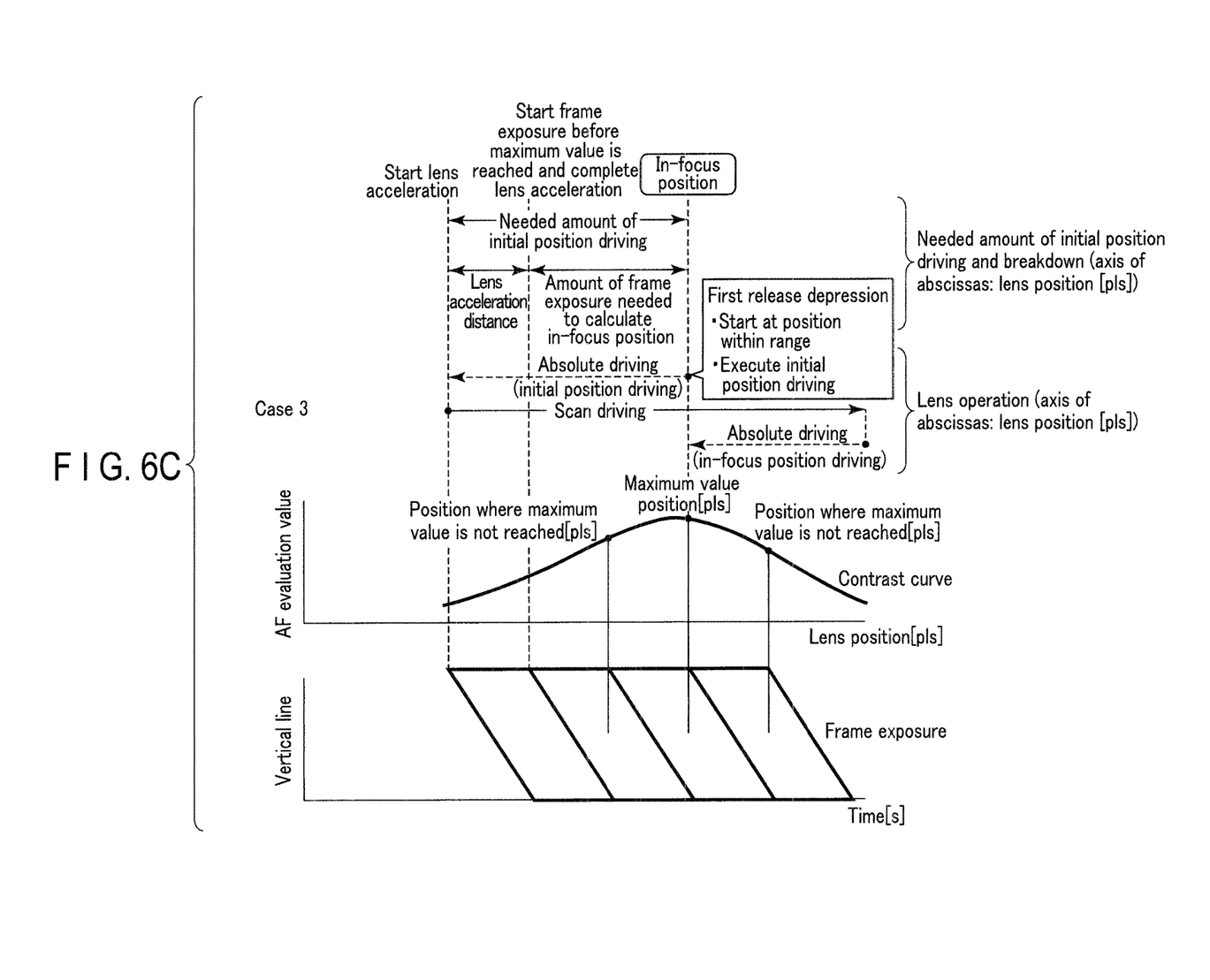
FIG. 6C is a diagram illustrating lens driving executed if the position where the lens is placed when the instruction to start AF is given is the in-focus position (case 3).

As illustrated in FIG. 6A to FIG. 6C, the needed number of frames "n" corresponds to frame exposure needed to enable an in-focus state to be detected in the shortest time before the AF evaluation value reaches the maximum value (the needed number of frames "n" is the minimum number of frames needed to detect the in-focus position before the AF evaluation value reaches the maximum value, and for example, n is set to 2). This corresponds to the number of frames needed to reliably acquire an AF evaluation value smaller than a value corresponding to the position of the maximum value before the position of the maximum value is reached (that is, the direction determination can be completed at the position of the maximum value). The adjustment coefficient k is a lens acceleration distance needed for the stopped focus lens to reach, during the scan driving, a speed at which the AF evaluation value can be acquired.

The needed amount of initial position driving "init_drv" and the amount of scan driving per frame "frame_drv" are expressed in the number of driving pitches (pls) of the lens motor 22A instead of being expressed directly in the moving amount of the focus lens.

Once the needed amount of initial position driving "init_drv" is calculated, the camera CPU 28 determines whether or not reliability of the defocus amount "def" calculated in step S402 described above is low (step S404). When the reliability of the defocus amount "def" is not low, in other words, the use of the defocus amount "def" poses no problem, the process is advanced to step S405 and subsequent steps to determine whether or not the initial position driving can be achieved using the defocus amount "def".

That is, the camera CPU 28 calculates a difference "delta" between the needed amount of initial position driving "init_drv" calculated in step S403 described above and the absolute value of the defocus amount "def" calculated in step S402 described above (step S405). Based on the result of the calculation, the camera CPU 28 determines whether or not the defocus amount "def" is larger than the needed amount of initial position driving "init_drv" (step S406). That is, camera CPU 28 determines whether or not the difference "delta" is smaller than 0. When the defocus amount "def" is larger than the needed amount of initial position driving "init_drv", the camera CPU 28 ends the processing of the initial position driving subroutine without executing the initial position driving. The camera CPU 28 advances to the scan driving start process in step S5 described above.

When the defocus amount can be calculated and the defocus amount "def" at the AF start position is larger than the needed amount of initial position driving "init_drv", the initial position driving is not implemented. This corresponds to a "case 1" as illustrated in FIG. 6A. That is, if the AF start position is the position of an out-of-focus state as located outside the range of the needed amount of initial position driving, the initial position driving is a meaningless operation, in fact contributing to reducing the AF speed, as described above with reference to FIG. 3A. Whether or not the AF start position is the position of the out-of-focus state can be determined based on the defocus amount "def". Thus, in the image pickup apparatus 10 according to the present embodiment, the camera CPU 28 can determine a case where execution of the initial position driving is preferably omitted based on the defocus amount "def", avoiding the unwanted initial position driving.

Consequently, in the case 1, the scan driving is started in accordance with the first release depression, to detect a peak of a contrast curve indicative of a relation between the lens position and the AF evaluation value, in other words, to detect the maximum value position. When the peak is detected, the scan driving is ended and the in-focus position is calculated. Then, in-focus position driving to the calculated in-focus position is executed. The in-focus position driving is absolute position driving to a target lens position, and thus, the focus lens is driven to the target lens position at the highest speed. In contrast, in the scan driving, the focus lens is driven at a speed lower than the highest speed, with frame exposure simultaneously sequentially performed.

In step S406 described above, when the defocus amount "def" is not larger than the needed amount of initial position driving "init_drv", the camera CPU 28 executes the initial position driving. That is, the camera CPU 28 calculates an initial position "init_pos" that is a start position for the initial position driving by adding the difference "delta" calculated in step S405 described above to the current position of the focus lens "pos_now" (step S407). The current position of the focus lens "pos_now" can be acquired during the initialization operation in step S1 described above or during periodic communication by the camera CPU 28 through communication with the lens CPU 26. Of course, the camera CPU 28 can acquire the current position of the focus lens "pos_now" at any other timing. The camera CPU 28 executes the absolute position driving on the focus lens to shift the focus lens to the calculated initial position "init_pos" (step S408). Subsequently, the camera CPU 28 ends the processing of the initial position driving subroutine and advances to the scan driving start process in step S5 described above.

As described above, when the defocus amount can be calculated and the absolute value of the defocus amount "def" at the AF start position is not larger than the needed amount of initial position driving "init_drv", the camera CPU 28 sets an initial position driving amount equal to the difference "delta" instead of the needed amount of initial position driving "init_drv". This corresponds to a case where the AF start position lies within the range of the needed amount of initial position driving like a "case 2" as illustrated in FIG. 6B. As described above, in the image pickup apparatus 10 according to the present embodiment, the camera CPU 28 executes the initial position driving by a driving amount corresponding to the difference "delta" between the needed amount of initial position driving "init_drv" and the absolute value of the defocus amount "def". This results in the need for the minimum amount of initial position driving, enabling a reduction in the needed time for the initial position driving and suppression of an increase in scan time resulting from execution of the initial position driving.

Upon determining in step S401 described above that the image pickup apparatus 10 is not a phase difference machine or determining in step S404 described above that the reliability of the defocus amount "def" is low, the camera CPU 28 further determines whether or not the contrast is significantly low (step S409). In other words, the camera CPU 28 determines whether or not the AF evaluation value output by the contrast AF evaluation value calculation circuit 46 before the focusing operation is performed is smaller than a predetermined value. Upon determining that the contrast is not significantly low, the camera CPU 28 executes initial position driving not based on the defocus amount "def" as is the case with the related art. That is, the camera CPU 28 calculates the initial position "init_pos", which is the start position for the initial position driving, by adding the needed amount of initial position driving "init_drv" calculated in step S403 described above to the current position of the focus lens "pos_now" (step S410). The camera CPU 28 then executes the absolute position driving on the focus lens to shift the focus lens to the calculated initial position "init_pos" (step S408). Subsequently, the camera CPU 28 ends the processing of the initial position driving subroutine and advances to the scan driving start process in step S5 described above.

As described above, if the detection of the defocus amount is disabled or the reliability of the defocus amount is low, the camera CPU 28 executes the initial position driving not based on the defocus amount "def". This corresponds to a case where the AF start position is the in-focus position like a "case 3" as illustrated in FIG. 6C. In such a case, the image pickup apparatus 10 according to the present embodiment can execute initial position driving similar to the initial position driving in the related art. Thus, the present embodiment enables a reduction in the time needed for the scan driving executed until peak detection is achieved compared to the case where the initial position driving is not executed.

Upon determining in step S409 described above that the contrast is significantly low, the camera CPU 28 ends the processing of the initial position driving subroutine without executing the initial position driving and advances to the scan driving start process in step S5 described above.

That is, the case of a significantly small contrast value corresponds to a case where the AF start position is a significantly out-of-focus position. Therefore, in the image pickup apparatus 10 according to the present embodiment, when the AF evaluation value output by the contrast AF evaluation value calculation circuit 46 before the focusing operation is performed is smaller than the predetermined value, the camera CPU 28 omits execution of the initial position driving. Consequently, even if the defocus amount is uncertain, an increase in focusing time resulting from the initial position driving can be prevented with a high probability.

The processing of the initial position driving subroutine as described above is executed to enable the initial position driving to be implemented in an adaptive manner. This enables prevention of an unwanted increase in focusing time.

As described above, the image pickup apparatus 10 according to the embodiment includes the image pickup device 30 that picks up an image of object light via the image-acquiring optical system 16 including the focus lens to generate an image pickup signal, the contrast AF evaluation value calculation circuit 46 serving as a first focus detection circuit to calculate the AF evaluation value indicative of the contrast based on the image pickup signal output by the image pickup device 30, the phase difference AF defocus amount calculation circuit 48 serving as a second focus detection circuit to perform focus detection based on phase difference detection to output the defocus amount of the image-acquiring optical system 16, and the camera CPU 28 serving as a control circuit to control the focusing operation of detecting the position of the focus lens where the AF evaluation value is indicative of an extreme value based on the output from the contrast AF evaluation value calculation circuit 46. Based on the defocus amount output by the phase difference AF defocus amount calculation circuit 48, the camera CPU 28 controls the initial position driving of the focus lens executed before the focusing operation based on the output from the contrast AF evaluation value calculation circuit 46 is performed. Therefore, the initial position driving is activated only when the initial position driving is needed and the amount of initial position driving to be executed can be minimized. This enables the AF speed to be increased.

In this case, when the absolute value of the defocus amount is larger than the predetermined driving amount of the initial position driving, the camera CPU 28 omits execution of the initial position driving. This enables avoidance of an increase in focusing time resulting from unwanted execution of the initial position driving.

When the absolute value of the defocus amount is not larger than the predetermined driving amount of the initial position driving, the camera CPU 28 executes the initial position driving by a driving amount corresponding to the amount of the difference between the predetermined driving amount and the defocus amount. Consequently, the amount of initial position driving to be executed can be minimized, enabling a reduction in the needed time for the initial position driving and suppression of an increase in scan time resulting from execution of the initial position driving.

If the detection of the defocus amount is disabled or the reliability of the defocus amount is low, the camera CPU 28 executes the initial position driving not based on the defocus amount output by the phase difference AF defocus amount calculation circuit 48. Consequently, when, for example, the AF start position is the in-focus position, the camera CPU 28 can execute initial position driving similar to the initial position driving in the related art. Thus, the present embodiment enables a reduction in the time needed for the scan driving executed until peak detection is achieved compared to the case where the initial position driving is not executed.

In this case, the camera CPU 28 omits execution of the initial position driving when the AF evaluation value output by the contrast AF evaluation value calculation circuit 46 before the focusing operation is performed is smaller than the predetermined value. Consequently, even if the defocus amount is uncertain, an increase in focusing time resulting from the initial position driving can be prevented with a high probability.

Furthermore, the image pickup apparatus 10 according to the embodiment as described above includes the image pickup device 30 that picks up an image of object light via the image-acquiring optical system 16 including the focus lens to generate an image pickup signal, the contrast AF evaluation value calculation circuit 46 serving as a focus detection circuit to calculate the AF evaluation value indicative of the contrast based on the image pickup signal output by the image pickup device 30, and the camera CPU 28 serving as a control circuit to control the focusing operation of detecting the position of the focus lens where the AF evaluation value is indicative of an extreme value based on the output from the contrast AF evaluation value calculation circuit 46. When the AF evaluation value output by the contrast AF evaluation value calculation circuit 46 before the focusing operation is performed is smaller than the predetermined value, the camera CPU 28 is controllably inhibits the initial position driving of the focus lens which is executed before the focusing operation based on the output from the contrast AF evaluation value calculation circuit 46 is performed. Therefore, the initial position driving is activated only when the initial position driving is needed. This enables the AF speed to be increased.

The embodiment also provides an autofocus method of performing a focusing operation based on an AF evaluation value, the method including calculating the AF evaluation value indicative of a contrast based on an image pickup signal output by the image pickup device 30 that picks up an image of object light via the image-acquiring optical system 16 including the focus lens to generate the image pickup signal, to detect the position of the focus lens where the AF evaluation value is indicative of an extreme value. In the method, focus detection is performed based on phase difference detection to calculate the defocus amount "def" of the image-acquiring optical system 16 (step S402). Based on the calculated defocus amount "def", the initial position driving of the focus lens is controlled which is executed (steps S405 to S408) before the focusing operation based on the AF evaluation value is performed. Therefore, the initial position driving is activated only when the initial position driving is needed and the amount of initial position driving to be executed can be minimized. This enables the AF speed to be increased.

The autofocus method according to the embodiment further includes determining whether the AF evaluation value calculated before the focusing operation is performed is smaller than the predetermined value (step S409), and when the AF evaluation value is smaller than the predetermined value, controllably inhibiting the initial position driving of the focus lens executed before the focusing operation based on the AF evaluation value is performed. Therefore, the initial position driving is activated only when the initial position driving is needed. This enables the AF speed to be increased.

The present invention has been described based on the embodiment. However, the present invention is not limited to the above-described embodiment, and the embodiment can of course be varied and applied within the spirits of the present invention.

For example, in the embodiment, the lens-replaceable image pickup apparatus 10 has been described by way of example which includes the body unit 12 and the lens unit 14 that can be installed in and removed from the body unit 12. However, the present invention can similarly be applied to a lens-integrated image pickup apparatus that precludes the lens unit 14 from being removed from the body unit 12.

The control included in the technique described in the above-described embodiment and described mainly with reference to the flowcharts may be implemented using a program. The program may be stored in a storage medium or a storage unit in a non-transitory manner. Various methods may be used to store the program in the storage medium or the storage unit. The program may be stored in the storage medium or the storage unit before the product is shipped, or a distributed storage medium may be utilized so that the program can be stored in the storage medium, or the program may be downloaded via the Internet and stored in the storage medium or the storage unit.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image pickup apparatus comprising:
an image pickup device configured to pick up an image of object light via an image-acquiring optical system including a focus lens to generate an image pickup signal;
a first focus detection circuit configured to calculate an evaluation value indicative of a contrast based on the image pickup signal output by the image pickup device;
a second focus detection circuit configured to perform focus detection based on phase difference detection to output a defocus amount of the image-acquiring optical system; and
a control circuit configured to control a focusing operation of detecting a position of the focus lens where the evaluation value is indicative of an extreme value based on an output from the first focus detection circuit, wherein
based on the defocus amount output by the second focus detection circuit, the control circuit controls initial position driving of the focus lens executed before the focusing operation based on the output from the first focus detection circuit is performed.

2. The apparatus according to claim 1, wherein
the control circuit is configured to omit execution of the initial position driving when an absolute value of the defocus amount is larger than a predetermined driving amount of the initial position driving.

3. The apparatus according to claim 1, wherein
the control circuit is configured such that when an absolute value of the defocus amount is not larger than a predetermined driving amount of the initial position driving, the control circuit is configured to execute the initial position driving by a driving amount corresponding to an amount of a difference between the predetermined driving amount and the defocus amount.

4. The apparatus according to claim 1, wherein
the control circuit is configured to execute the initial position driving not based on the defocus amount output by the second focus detection circuit in one of a case where detection of the defocus amount is disabled and a case where reliability of the defocus amount is low.

5. The apparatus according to claim 4, wherein
the control circuit is configured to omit execution of the initial position driving when the evaluation value output by the first focus detection circuit before the focusing operation is performed is smaller than a predetermined value.

6. An autofocus method of performing a focusing operation based on an evaluation value, the method including calculating the evaluation value indicative of a contrast based on an image pickup signal output by an image pickup device configured to pick up an image of object light via an image-acquiring optical system including a focus lens to generate the image pickup signal, to detect a position of the focus lens where the evaluation value is indicative of an extreme value, the method comprising:
performing focus detection based on phase difference detection to calculate a defocus amount of the image-acquiring optical system; and
based on the calculated defocus amount, controlling initial position driving of the focus lens which is executed before the focusing operation based on the evaluation value is performed.

7. The method according to claim 6, wherein
the controlling initial position driving of the focus lens includes omitting execution of the initial position driving when an absolute value of the defocus amount is larger than a predetermined driving amount of the initial position driving.

8. The method according to claim 6, wherein
when an absolute value of the defocus amount is not larger than a predetermined driving amount of the initial position driving, the controlling initial position driving of the focus lens includes executing the initial position driving by a driving amount corresponding to an amount of a difference between the predetermined driving amount and the defocus amount.

9. The method according to claim 6, wherein
the controlling initial position driving of the focus lens includes executing the initial position driving not based on the defocus amount output by the second focus detection circuit in one of a case where detection of the defocus amount is disabled and a case where reliability of the defocus amount is low.

10. The method according to claim 9, wherein
the controlling initial position driving of the focus lens includes omitting execution of the initial position driving when the evaluation value output by the first focus detection circuit before the focusing operation is performed is smaller than a predetermined value.

11. A storage medium non-transitory storing computer-readable autofocus programs which are readable by a computer, the computer performing:
an image pickup function which picks up an image of object light via an image-acquiring optical system including a focus lens to generate an image pickup signal;
a first focus detection function which calculates an evaluation value indicative of a contrast based on the image pickup signal output by the image pickup function;
a second focus detection function which performs focus detection based on phase difference detection to output a defocus amount of the image-acquiring optical system; and
a control function which controls a focusing operation of detecting a position of the focus lens where the evaluation value is indicative of an extreme value based on an output from the first focus detection function, wherein
based on the defocus amount output by the second focus detection function, the control function controls initial position driving of the focus lens executed before the focusing operation based on the output from the first focus detection function is performed.

* * * * *